United States Patent [19]

Swidler

[11] Patent Number: 5,428,095
[45] Date of Patent: * Jun. 27, 1995

[54] PROTECTIVE COATING COMPOSITION AND METHOD OF USING SUCH COMPOSITION

[75] Inventor: Ronald Swidler, Palo Alto, Calif.

[73] Assignee: Cal-West Automotive, Los Altos, Calif.

[*] Notice: The portion of the term of this patent subsequent to Jan. 25, 2011 has been disclaimed.

[21] Appl. No.: 9,518

[22] Filed: Jan. 27, 1993

Related U.S. Application Data

[63] Continuation-in-part of Ser. No. 896,468, Jun. 9, 1992, Pat. No. 5,281,436.

[51] Int. Cl.$^6$ .......................... C08J 3/03; C08L 31/02; B05D 3/10
[52] U.S. Cl. ..................... 524/389; 524/380; 524/522; 524/556; 524/560; 427/156; 427/336; 427/388.4
[58] Field of Search ............... 524/380, 389, 522

[56] References Cited

U.S. PATENT DOCUMENTS

| | | | |
|---|---|---|---|
| 3,580,972 | 5/1971 | Isaksen et al. | 260/836 |
| 3,674,896 | 7/1972 | Purcell et al. | 525/378 |
| 4,130,524 | 12/1978 | Boerwinkle et al. | 524/555 |
| 4,303,581 | 12/1981 | Levine et al. | 523/412 |
| 4,324,684 | 4/1982 | Geiger et al. | 106/14.11 |
| 4,404,114 | 9/1983 | Mohr et al. | 106/14.13 |
| 4,485,131 | 11/1984 | Adams et al. | 524/505 |
| 4,544,686 | 10/1985 | Bromley et al. | 523/411 |
| 4,588,519 | 5/1986 | Kuhn | 106/14.13 |
| 5,081,174 | 1/1992 | Vanbuskirk | 427/156 |
| 5,085,696 | 2/1992 | Muller et al. | 106/14.14 |
| 5,166,254 | 11/1992 | Nickle et al. | 524/512 |
| 5,186,978 | 2/1993 | Woodhall et al. | 427/154 |
| 5,191,014 | 3/1993 | Roberts et al. | 524/555 |
| 5,194,483 | 3/1993 | Kawabata | 524/522 |
| 5,281,436 | 1/1994 | Swidler | 427/156 |

OTHER PUBLICATIONS

"Yumage ST-210" Water Miscible Cleaner; Material Safety Data Sheet and Brochure.
"Yumax GFC-3" Water Miscible Paint Protective Coating; Material Safety Data Sheet and Brochure.
"Yumax SR-10" Water Miscible Paint Protective Coating; Material Safety Data Sheet and Brochure.
"KATS UL-3000V" Protective Transit Coating; Material Safety Data Sheet.
"KATS UL-7000" Water Base Detergent Transit Coating Remover; Material Safety Data Sheet.
"Acrysol TT-615" Material Safety Data Sheet—Rohm and Haas Company.
"Acrysol WS-32" Material Safety Data Sheet—Rohm and Haas Company.
"Carboset" Technical Data Sheet—B.F. Goodrich Company.
"Acrysol WS-24" Technical Data Sheet—Rohm and Haas Company.

*Primary Examiner*—Paul R. Michl
*Assistant Examiner*—Olga Asinovsky
*Attorney, Agent, or Firm*—Townsend and Townsend Khourie and Crew

[57] ABSTRACT

A composition is provided for protecting exterior surfaces of automobiles and other products against abrasive dust, acid rain, etc. The composition is applied as a mixture of water solubilized acrylic acid copolymer, pH-neutral acrylic copolymer, alkyl alcohol, surfactant, and water. The composition dries on the exterior surface to form a tough flexible coating that can be removed by an alkaline aqueous detergent solution.

9 Claims, No Drawings

PROTECTIVE COATING COMPOSITION AND METHOD OF USING SUCH COMPOSITION

The application is a continuation-in-part of U.S. Ser. No. 896,468, filed Jun. 6, 1992, now U.S. Pat. No. 4,281,436, which is incorporated herein by reference for all purposes.

FIELD OF THE INVENTION

The present invention relates to surface protective coatings and more specifically to coatings effective for protecting the exposed surfaces of vehicles and building fixtures.

BACKGROUND OF THE INVENTION

The surface paint finishes of new vehicles are subject to a variety of injuries both during the assembly process and during transportation from the assembly plant to retail locations. These finishes are especially prone to damage in the first months following manufacture because the paint has not had sufficient time to cure. Typical sources of damage include acid rain, bird droppings, and "rail dust", a cloud of hard, abrasive particles which rises from a rail bed as a train passes over the rails. Rail dust is an especially difficult problem for car manufacturers as many cars are transported from assembly plants or dockyards to retail markets by rail. The damage inflicted on the vehicle's surface finish during transit can be quite severe, even requiring shipment back to the assembly plant for complete repainting.

In addition to new vehicles, other products are also subjected to abrasive and deleterious conditions during transit. For instance, storm windows and other glass products must be specially protected to avoid scratching and marring during road and rail transit. Deck cargo is also susceptible to surface damage caused by salt water and other factors. Further, vehicle surfaces are often damaged by environmental factors during normal driving. For example, train locomotive exteriors can be damaged by the same factors that impact on the vehicles they are transporting. Even typical city and country driving can quickly damage car, bus, truck, etc. finishes. A particularly difficult problem is caused by brake dust, a tenacious black material which coats the wheels of cars during normal use. Unfortunately, washing or scrubbing with soap and water often cannot adequately remove brake dust from most wheels. Only tedious wiping of every crevice and indentation in the wheel can remove brake dust.

Various solutions have been attempted to protect the exposed surfaces of vehicles during the manufacturing and transportation. Physical protection (e.g., covering the vehicle with plastic or canvas) is effective, but it is labor intensive and therefore prohibitively expensive for mass shipments or typical driving. Further, the materials used for physical protection also create solid waste problems as they are not readily reusable. Chemical methods have also been proposed, but to-date these methods have found limited use because of their difficult application to, and removal from, the vehicle's surface. Also, traditional chemical methods suffer from high cost and the health and environmental dangers posed by solvent-based solutions and coatings. Especially important in chemical protective techniques is the ability to remove the chemical protective coating with water in view of the ever increasing regulation of solvent use in the workplace and the dangers solvent may pose to the vehicle's surface.

It is therefore clear that a method of protecting surfaces is needed which allows for easy, inexpensive, and safe application and removal.

SUMMARY OF THE INVENTION

The present invention includes a surface protective coating composition and a method of protecting surfaces. The coating composition includes a water solubilized acrylic acid copolymer, a pH-neutral acrylic copolymer, an alkyl alcohol having between one and four carbon atoms, a surfactant, and water. In addition, the composition may include a variety of other materials such as cosolvents and coalescers, antioxidants, antiozonates, UV stabilizers, colorants, defoamers, corrosion inhibitors etc. As used herein, "pH neutral acrylic copolymer" refers to acrylic copolymers that can not be solubilized at an alkaline pH. Typically, those copolymers will have few if any free acidic or basic functions. In a preferred embodiment, the composition includes between about 1 and about 20% of a water solubilized acrylic acid copolymer, between about 0% and about 60% of a pH neutral acrylic copolymer, between about 1% and about 20% of an alkyl alcohol (having four or fewer carbon atoms), between about 0.01 and about 2% of a surfactant, and water. Each of the components is provided on a per weight basis.

In more preferred embodiments, the composition includes between about 1 and about 10% of a water solubilized acrylic acid copolymer, between about 1 and about 10% of a phi neutral acrylic copolymer, between about 1 and about 10% of an alkyl alcohol (having four or fewer carbon atoms), between about 0.1 and about 1% of a surfactant, and water. In each of the above embodiments, the water solubilized acrylic acid copolymer preferably contains volatile ammonium or ethanol ammonium carboxylate moieties. In other preferred embodiments, the surfactant used in the above embodiments includes a fluorinated surfactant.

Additional components can be added to the coating composition to impart certain properties. For example, certain materials capable of blocking ultra-violet radiation can be added to provide protection against the color-fading effects of sunlight. Other additives can effect the pliability for use on flexible surfaces. Still other additives can be used to impart color, texture, etc.

A preferred method of protecting surfaces according to this invention includes steps of applying the coating composition to the surface to be protected in a substantially continuous film. The composition is then dried to form a tough, yet flexible coating. Additionally, the present invention includes a method of transporting vehicles or other products in a manner that protects their exterior finishes. This method includes steps of applying the coating composition to the vehicle or product in a substantially continuous film, transporting the vehicle or product, and removing the coating by washing the coated surface with an aqueous solution having a pH substantially between 7 and 9. "Vehicle" as used herein includes such modes of transportation as cars, trucks, boats, bicycles and the like. The coating composition is easily applied and readily removed after use with relatively reduced health and environmental risk.

In many preferred embodiments, the compositions of this invention form a surface coating that acts as a sacrificial layer between the surface to be protected and dirt or other deleterious environmental factors. Over time, dirt accumulates on the sacrificial layer until it is necessary to clean the surface. Cleaning is facilitated by the present invention because the sacrificial layer can easily be removed together with the dirt.

In a specific preferred embodiment, an acrylic-based composition of this invention is used to protect the wheels of a vehicle from brake dust. In this method, clean wheels are coated with an acrylic formulation. Then during normal operation, a layer of brake dust accumulates on the acrylic coating. When the wheel is sufficiently dirty, the acrylic coating (together with the brake dust) is removed with an alkaline solution or other release agent to provide a clean wheel. The wheel can then be recoated with another acrylic layer.

In another aspect of this invention, a method is provided for maintenance of various structures such as building fixtures and furnitures. According to this method, a fixture or piece of furniture is coated with a coating composition of this invention. This improves the appearance of the fixture or furniture and provides a removable surface on which dirt can accumulate. After sufficient dirt has accumulated, a release agent is applied to the fixture or furniture so that a clean surface results. Specific examples of protectible fixtures include bathroom tiles, bathtubs, electrical switch plates, bannisters, etc.

A further understanding of the nature and advantages of the invention herein may be realized by reference to the remaining portions of the specification.

DESCRIPTION OF THE PREFERRED EMBODIMENTS

The present invention provides an improved surface protective coating composition and method for protecting surfaces. The method and coating composition produce a film which adheres well to a surface to be protected, with few or no pinholes. Further, the coating film may be removed easily with a pH-basic water wash (i.e., an aqueous solution having a pH greater than 7).

The surface protective coating composition of the invention preferably includes a water solubilized acrylic acid copolymer, a pH-neutral acrylic copolymer, an alkyl alcohol, and one or more surfactants (e.g., a fluorinated surfactant). In preferred embodiments, the water solubilized acrylic acid copolymer contains volatile conjugate bases (e.g., the copolymer includes ammonium or ethanol ammonium carboxylate moieties). Such materials may be prepared, for example, by adding ammonia or an ethanol amine to an acrylic acid copolymer. Upon drying, coating compositions employing these volatile conjugate bases will release ammonia or ethanol amine and leave a tough, weather-resistant coating containing free acrylic acid copolymers. The coating resists discoloration and opacity resulting from exposure to sunlight, and other influences. In particular, the coating does not absorb water and thus does not form the opaque films associated with many other coatings. When it is no longer needed, the coating can be removed with an aqueous detergent solution having a basic pH.

In one preferred embodiment, the coating composition contains between about 1 and 10% of a water solubilized acrylic acid copolymer solution, between about 1 and 10 by weight of a pH-neutral acrylic copolymer, between about 1 and 10% of an alkyl alcohol containing four or fewer carbon atoms, between about 0.01 and 1% of surfactant, and water. Preferably, the surfactant component of the composition will include a fluorinated surfactant. In some preferred embodiments, the composition also includes a thickener having a concentration of between about 0.1% and 1% by weight.

Although the surface protective coating is preferably water insoluble in neutral conditions, it should be soluble in basic solutions. The acid moieties of the acrylic acid copolymer present in the coating provide water solubility upon contact with a pH-basic aqueous solution due to the formation of water-soluble carboxylate salts. One suitable acrylic acid copolymer solution is commercially available under the trade name "Acrysol ™" (available from Rohm & Haas). The acrylic acid copolymer may also be provided as a mixture of several grades of water solubilized acrylic acid copolymers depending on the desired qualities of the coating. Further, the individual acrylic acid copolymers can contain variable percentages of acrylic acid, methacrylic acid and other monomer units. The copolymer may also be provided in a range of molecular weights. In all cases, the acrylic acid copolymer should be water solubilized with an volatile conjugate base such as ammonia or an ethanol amine as discussed above. In preferred embodiments, the water solubilized acrylic acid copolymer will be present in the composition of about 5–10% by weight of the total composition.

The coating compositions also include a pH-neutral acrylic copolymer, such as are sold under the trade name Rhoplex ™" (Rohm & Haas) to increase the hardness or flexibility of the coating. Generally, preferred formulations of the coating composition contain between about 1 and about 5% of such copolymers by weight of the total composition. The chemical composition of the acrylic copolymer may vary depending upon the intended application. For example, copolymers containing relatively large numbers of methacrylate (as opposed to acrylate) monomer units can be used to increase the modulus of the coating composition. Suitable acrylic copolymers generally include those having various alkyl carboxylate monomer units (e.g. methyl, ethyl, propyl, butyl etc. esters).

The surface protective coating composition also includes an alkyl alcohol ($C_nH_{2n+1}OH$). Preferred alcohols are those where $n \leq 4$, including methyl alcohol, ethyl alcohol, and propyl alcohol. A most preferred alcohol is ethyl alcohol. The percentage of alcohol utilized is preferably less than about 5% by weight (based on 95% alcohol), with compositions having between 1.5% and 3% alcohol most preferred. When ethyl alcohol is utilized, a preferred composition includes about 2.5% alcohol by weight. When methyl or propyl (such as isopropyl or n-propyl) alcohol is utilized, compositions with less than about 10% by weight of alcohol are preferred, and compositions of between about 1 and 5% are most preferred.

The surface protective coating composition of the invention also includes a surfactant. It is important to control the amount and type of surfactant so that the film does not rewet to cause whiting of the surface. Rewetting results when locally high surfactant concentrations on the coating surface are exposed to water from dew or other sources.

The surfactant is, in one embodiment, a non-ionic biodegradable surfactant such as an acetylenic diol. In preferred embodiments the invention includes an alkyl aryl surfactant (such as Triton CF-10 and CF-12), a polyethoxy adduct, or a modified (poly) ethoxylate (such as Triton DF-12 and DF-16). Other surfactants include nonylphenoxypolyethanol (such as IGEPAL CO-660 made by GAF), polyoxyalkylene glycol (such as Macol 18 and 19 made by Mazur Chemicals), acetylenic diol-based surfactants (such as Surfynol 104A made by Air Products), and the like. Preferred compositions include up to 1% surfactant. Most preferred compositions include between 0.05% and 0.15% by weight surfactant and more preferably about 0.1% surfactant.

In addition to (or in place of) the above surfactant, the protective coating compositions preferably include a defoamer or wetting agent to reduce the formation of pinholes and facilitate smooth coverage of the surface, especially when the coating composition is applied with a spray gun. Fluorinated surfactants such as "Flourad TM" (available from 3M Corporation) are preferred defoamers. Specific fluorinated surfactants suitable for use in this invention include "Fluorad FC-171" and "Fluorad FC-431". Generally such surfactants comprise between 0.02 and 1% of the weight of the coating composition, with about 0.1% being preferred. The fluorinated surfactant may also be a mixture of two or more grades of surfactant, depending on the qualities of the coating which are desired.

Many preferred embodiments also include other additives such as thickeners, ultra-violet radiation blockers, cosolvents and coalescers, antioxidants, antiozonates, UV stabilizers, colorants, defoamers, corrosion inhibitors, etc. A thickener renders the composition thicker so that it can be more easily applied to a vertical work surface. Thickeners also prevent the undesirable phenomenon of "sagging" in which the coating becomes thinner near the top of a vertical work surface. Specific examples of compatible copolymer thickeners include "Acrysol I-98" and "Acrysol TT-615" available from Rohm and Haas. UV blockers protect the surface from sunlight and associated problems such as color fading. Suitable UV blockers include benzotrriazoles, salicylates, benzophenones, coumarins, stilbenes, etc. Suitable corrosion inhibitors include benzoate salts and fatty amines.

The coating formulations or this invention also includes a substantial amount of water, such as 18 megohm/cm deionized water (D.I. water). In one embodiment of the invention, the balance of the composition is composed of water, although a variety of other materials may also be included such as dyes, odorants, and the like.

The coating compositions are made by conventional means, typically including steps of simply admixing the components (or aqueous solutions, dispersions, etc. thereof) at substantially atmospheric pressure so as to form a substantially homogeneous mixture. In preferred embodiments, ammonia or an ethanol amine is added until the thickener dissolves (typically at a pH of between about 7 and about 9). It has been found that the mechanical and thermal properties of the coating of the invention can be controlled by appropriate combination of neutral and acidic acrylic polymer solutions. Acidic polyacrylics allow for the removal of the coating with a basic-pH water wash, but if used alone they can impart brittleness to the dried coating. This will cause the coating to crack with changes in temperature or upon physical contact and thus impair the protection afforded by the coating. Neutral polyacrylics act to make the coating more flexible or hard depending the specific type and amount added. But if neutral polyacrylics are used alone, the coating generally can not be removed by an aqueous pH-basic detergent solution. Thus, the solubility, mechanical, and thermal properties of the coating will depend, in part, on the ratio of acrylic acid copolymer to neutral polyacrylics. However, care should be taken when mixing polyacrylics to produce a clear film (i.e., the polyacrylics should be miscible) so that the coating's mechanical properties are uniform.

The present invention also includes a method of protecting surfaces wherein a substantially continuous film of the above-described surface protective coating composition is applied to the surface to be protected. Such surfaces may include the exterior painted portions of an automobile or other vehicle. The coating composition is applied by one of a variety of techniques. Preferred techniques include brushing and spraying of the surface with the coating composition. In some cases, additional water may be added for easier application, such as a 10% dilution. Thereafter, the coating composition may be applied with a pressure pot sprayer, preferably first in a thin mist and, thereafter, in a flow coat or thicker substantially continuous film. The coating composition is sprayed primarily on the surface to be protected, although overspray will not pose significant problems since any overspray may be readily removed with, for example, a wet towel or sponge. The resulting masking coating composition is from about 0.1 to about 10 mils thick, preferably about 0.5 to about 2 mils thick, with a preferred thickness of about 1 mil.

In other preferred embodiments, the coating composition is applied in an aerosol form to a surface. In such embodiments, the composition is stored in a container pressurized with any of a number of propellants including such environmentally benign materials as dimethyl ether, nitrogen, or carbon dioxide. Alternatively, the composition can be stored in a pump-type spray can.

The coating composition is then permitted to dry, normally at atmospheric temperatures and pressures. Such drying will take about 5 to 10 minutes in typical applications (at room temperature and 30% humidity). Significantly longer drying times are needed at 50° F. For such lower temperatures, additional ethanol may be provided in a separate container to increase the ethanol content by about 10% by weight.

The invention further includes a method of transporting vehicles which protects the exterior painted portions of the vehicle from scratches. Generally, the above-described surface protective coating composition is applied to the surface to be protected, the vehicle is transported, and the protective coating is then removed by washing the coated surfaces with an aqueous detergent solution having a pH of greater than 7 and preferably between 7 and 9 (e.g., a solution of aqueous ammonia, sodium carbonate, potassium carbonate, ethanol amines, etc.). For example, cars to be loaded onto auto-carriers (either road or rail) are first cleaned of surface debris and dust and then coated with the surface protective coating composition of the invention as described above. The cars are then transported to their destination where the surface protective coating is removed by washing with an alkaline aqueous detergent solution. Ammonia and ethanol amines are preferred for use in the detergent solution because they form soluble salts with acrylic acid copolymers and because they act fast.

In addition, the coatings of the present invention may be applied to protect sensitive finishes on most any item exposed to deleterious environmental factors. For example, the composition of this invention can be used to coat glass and chrome products being transported, boats being stored outdoors (particularly during winter), chrome tanks on tank trucks, and vehicles generally. Further, vehicle windshields and finishes can be protected against accumulations of insects and other bugs in environments where they are a problem. It has also been found that coatings prepared according to the present invention can be used to protect against graffiti. The paint from graffiti is simply washed away together with the protective coating by wiping with an alkaline aqueous detergent solution.

A particularly useful application of the present invention is to protect wheels and tires of vehicles during normal use. In these embodiments, the coating composition is applied to the wheel and/or tire in the manner described above. Typically, a black layer of brake dust accumulates on wheels during normal operation. Because the wheels and tires are coated with the removable coating composition of this invention, the brake dust (and other accumulated dirt) is easily removed by application of an ammonia solution or other release agent. The resulting clean wheel and tire can be re-coated with another layer of the coating composition.

Application of a coating composition to tires and wheels according to this invention provides other important advantages. For example, the appearance of tires is greatly improved by applying the acrylic coatings of this invention. Even dirty scuffed tires are given an attractive matte black finish by the coating compositions of this invention. Further, adjuvants such as antioxidants and antiozonates can be added to coating composition to afford some protection against ozone.

The coating compositions of this invention can also be used as a sacrificed layer to protect various items that are not necessarily associated with transportation. For example, various building fixtures found in bathrooms and most other rooms can be protected. Bathtubs, shower stalls, bathroom tiles and floors, etc. are all adversely affected by steam, mineral deposits from water, and soap scum. Much labor is expended by homeowners or maintenance personnel to remove bathroom deposits. The acrylic-based removable coating compositions of this invention are used to temporarily protect bathroom fixtures during normal use. When it is time to clean the bathroom, the coated surfaces are simply wiped with a release agent to remove the coating composition together with the accumulated dirt.

Other fixtures that can be protected by this invention include bannisters, electrical light switch plates, door knobs, windows, etc. Particularly preferred surfaces for coating include metals such as brass or chrome, ceramic, and glass.

Furniture may also be protected by the methods of this invention. In particular, lawn furniture and umbrellas can be protected by the coating compositions of this invention. In preferred embodiments, an ultra-violet radiation blocker is added to the coating composition to protect outdoor furniture and umbrellas from the effects of sunlight. Automobile upholstery can also be protected by the methods of this invention.

It should be noted that many of the protected surfaces tend to flex during normal use. For example, tires continually compress as they roll. In addition, pliable lawn furniture stretches when used. For these applications, the coating compositions of this invention must be sufficiently pliable to ensure that they do not crack during flexure. As noted above the pliability of the formulations of this invention can be controlled by adjusting the ratio of pH neutral acrylic copolymer to water solubilized acrylic copolymer. As more neutral copolymer is added, the pliability of the coating increases.

Finally, the appearance of many surfaces is improved with the coatings of this invention. For example, tires, scratched painted surfaces, black bumper moldings, brass fixtures, etc. have been observed to have improved appearance when coated with the compositions of this invention. It is believed that the coating compositions fill surface scratches to provide the appearance of a "clear coat." In addition, the composition may protect against corrosion of some metallic surfaces so that, for example, a brass surface does not need to be polished very often. It should be noted that the coating composition also protects tires and other surfaces from the deleterious effects of ozone, the ubiquitous pollutant formed in smog. It is known that ozone attacks rubbers and other elastomers, causing them to crack. By applying the coating compositions of this invention, cracking associated with ozone is reduced.

EXAMPLES

The following examples are intended to illustrate the present invention and are not intended to limit the scope of the invention in any way.

Example 1

The following components were combined at room temperature and at atmospheric pressure by slow stirring to form a suitable surface protective coating composition of the invention:

| Ingredient | Amount (Wt. %)* |
| --- | --- |
| Acrysol TM WS-24 | 6 |
| Acrysol TM WS-32 | 2 |
| Acrysol TM TT-615 | 0.1 |
| 95% Ethanol | 2.5 |
| Triton TM DF-16 | 0.1 |
| Fluorad TM FC-171 | 0.06 |
| Fluorad TM FC-431 | 0.04 |
| D.I. Water | 89.2 |

*All percentages refer to the dry weight of the active material. Listed commercial products may contain water in addition to active material.

Example 2

The following components were combined at room temperature and at atmospheric pressure by slow stirring to form a suitable surface protective coating composition of the invention:

| Ingredient | Amount (Wt. %)* |
| --- | --- |
| Acrysol TM WS-24 | 4 |
| Acrysol TM WS-32 | 2 |
| Rhoplex TM AC-630 | 2 |
| Acrysol TM TT-615 | 0.1 |
| 95% Ethanol | 2.5 |
| Triton TM DF-16 | 0.1 |
| Fluorad TM FC-171 | 0.06 |
| Fluorad TM FC-431 | 0.04 |
| D.I. Water | 89.2 |

*All percentages refer to the dry weight of the active material. Listed commercial products may contain water in addition to active material.

Two sets of tests have been conducted on finished surfaces protected with the above coating compositions. Protected and unprotected surfaces were subjected to, for example, ultraviolet radiation, salt water, acid rain, and abrasion. The finishes on the unprotected surfaces were damaged, while the finishes on the protected surfaces were unaffected by the above factors.

Example 3

Two other preferred compositions contain the ingredients noted, below.

| | | | |
|---|---|---|---|
| 6% | WS-24 | ROHN & HASS | (ACRYLIC EMULSION) |
| 2% | WS-32 | ROHN & HASS | (ACRYLIC EMULSION) |
| 0.25% | TT-615 | ROHN & HASS | (ACRYLIC EMULSION-THICKNER) |
| 1.0% | 630 | ROHN & HASS | (ACRYLIC EMULSION) |
| 2.5% | ETHYL ALCOHOL-190 PROOF | | |
| 2.0% | PROPYLENE GLYCOL NORMAL BUTYL ETHER | | |
| 0.1% | TRITON DF-16 | | (SURFACTANT) |
| 0.06% | FC171 | 3M | (SURFACTANT) |
| 0.04% | FC431 | 3M | (SURFACTANT) |
| 86.05% | D.I. WATER | | |

The advantages of the invention will now be apparent. The invention provides a surface protective coating composition and method of protecting surfaces which is easy and cost effective to use and at a relatively reduced health and environmental risk. Using the method of the invention, large surface areas or many surfaces may be protected from damage quickly, easily, cheaply, and safely. Although certain embodiments and examples have been used to describe the invention, it will be apparent to those skilled in the art that various changes may be made to those embodiments and/or examples without departing from the scope of the invention.

What is claimed is:

1. A method of protecting surfaces, comprising the steps of:
    (a) applying a surface protective coating composition to said surface, said step of applying resulting in a substantially continuous film of said surface protective coating composition, and said surface protective composition comprising an admixture of:
        (i) between about 1 and about 20% of a water solubilized acrylic acid copolymer by weight;
        (ii) between about 0 and about 60% of a pH-neutral aqueous dispersion of acrylic copolymers by weight;
        (iii) between about 1 and 20% of a one to four carbon alkyl alcohol by weight;
        (iv) between about 0.01 and about 2% of a surfactant by weight; and
        (v) water; and
    (b) removing the surface protective coating by contacting it with an alkaline aqueous solution.

2. The method of claim 1 wherein the surface is a vehicle wheel.

3. The method of claim 1 wherein the surface is on a flexible item selected from the group consisting of tires, lawn furniture, and automobile interiors.

4. The method of claim 1 wherein surface is a building fixture.

5. The method of claim 4 wherein the building fixture is selected from the group consisting of electrical light switch plates, bannisters, bathtubs, shower stalls, tiles, and floors.

6. The method of claim 1 wherein the step of applying a surface protective coating composition includes dispensing the composition in an aerosol form.

7. A method of protecting vehicle wheels from dirt accumulation, comprising the steps of:
    a) applying a surface protective coating composition to the wheels, said step of applying resulting in a substantially continuous film of said surface protective coating composition, and said surface protective composition comprising an admixture of:
        (i) between about 1 and about 20% of a water solubilized acrylic acid copolymer by weight;
        (ii) between about 0 and about 60% ethanol by weight;
        (iii) between about 0.01 and about 2% of a surfactant by weight;
        (iv) between about 0 and about 60% of a pH-neutral acrylic copolymer by weight; and
        (v) water;
    b) driving the vehicle; and
    c) removing the surface protective coating by washing the wheels with an aqueous solution having a pH substantially between 7 and 9.

8. The method of claim 7 wherein the surface protective coating composition includes
    (i) about 8% water solubilized acrylic acid copolymer by weight;
    (ii) about 2.5% of 95% ethanol solution by weight;
    (iii) about 0.1% fluorinated surfactant by weight; and
    (iv) about 0.1% thickener by weight;
    (v) about 2% pH-neutral acrylic copolymer by weight; and
    (vi) water.

9. The coating composition of claim 7 wherein said water solubilized acrylic acid copolymer contains volatile ammonium or ethanol ammonium carboxylate moieties.

* * * * *